United States Patent Office 3,157,572
Patented Nov. 17, 1964

3,157,572
PARENTERAL DIURETIC COMPOSITIONS OF 5-ACYLIMINO-4-SUBSTITUTED-$\Delta^2$-1,3,4 - THIADIAZOLIDINE-2-SULFONAMIDES
Roger Bruce Card, Nyack, N.Y., assignor to American Cyanamid Company, New York, N.Y., a corporation of Maine
No Drawing. Filed Jan. 6, 1961, Ser. No. 80,971
2 Claims. (Cl. 167—51.5)

This invention relates to novel compositions of matter and, more particularly, is directed to parenteral preparations of diuretic 5-acylimino-4-substituted-$\Delta^2$-1,3,4-thiadiazoline-2-sulfonamides. The 5-acylimino-4-substituted-$\Delta^2$-1,3,4-thiadiazoline-2-sulfonamides contemplated by the present invention include 5-formylimino-4-methyl-$\Delta^2$-1,3,4-thiadiazoline-2-sulfonamide,
5-acetylimino-4-methyl-$\Delta^2$-1,3,4-thiadiazoline-2-sulfonamide,
5-acetylimino-4-ethyl-$\Delta^2$-1,3,4-thiadiazoline-2-sulfonamide,
5-acetylimino-4-butyl-$\Delta^2$-1,3,4-thiadiazoline-2-sulfonamide,
5-acetylimino-4-benzyl-$\Delta^2$-1,3,4-thiadiazoline-2-sulfonamide,
5-acetylimino-4-p-nitrobenzyl-$\Delta^2$-1,3,4-thiadiazoline-2-sulfonamide,
5-propionylimino-4-methyl-$\Delta^2$-1,3,4-thiadiazoline-2-sulfonamide,
5-propionylimino-4-ethyl-$\Delta^2$-1,3,4-thiadiazoline-2-sulfonamide,
5-propionylimino-4-butyl-$\Delta^2$-1,3,4-thiadiazoline-2-sulfonamide,
5-butyrylimino-4-methyl-$\Delta^2$-1,3,4-thiadiazoline-2-sulfonamide and
5-butyrylimino-4-benzyl-$\Delta^2$-1,3,4-thiadiazoline-2-sulfonamide.

The preparation and properties of these diuretic 5-acylimino - 4 - substituted - $\Delta^2$ - 1,3,4 - thiadiazoline - 2-sulfonamides are set forth in U.S. Patent No. 2,783,241 to Young et al.

Parenteral preparations of these diuretic 5-acylimino-4 - substituted - $\Delta^2$ - 1,3,4 - thiadiazoline - 2 - sulfonamides have been difficult to formulate heretofore due to their relative insolubility in water. Previously, pharmaceutical solutions of these diuretics were solutions of their sodium salts. These solutions were found to be very unstable and decomposed rapidly when sterilized by heat. Because of this instability only a reconstitutable product could be marketed consisting of the sodium salt of the 5-acylimino-4-substituted-$\Delta^2$-1,3,4-thiadiazoline-2-sulfonamide reconstituted with water immediately before use. The marketing of this type of product involves a package with two containers in aseptic condition. The package is not only bulky and expensive to produce, but it is unpopular among the medical profession. Furthermore, sodium contributes towards water retention and, therefore, is not desirable in a diuretic preparation.

Compositions according to the present invention having the desired clarity, stability, and adaptability for parenteral use are obtained by dissolving from 0.10% to 10.0% by weight of the diuretic 5-acylimino-4-substituted-$\Delta^2$-1,3,4-thiadiazoline-2-sulfonamide in a vehicle consisting of a mixture of non-volatile, normally liquid polyethylene glycols which are soluble in both water and organic liquids and which have molecular weights of from about 200 to about 1500. Such mixtures of polyethylene glycols are commercially available and are usually obtained by condensing glycol with ethylene oxide. Although the amount of diuretic 5-acylimino-4-substituted-$\Delta^2$-1,3,4-thiadiazoline-2-sulfonamide dissolved in the above vehicle may vary from 0.10% to 10.0% by weight, it is preferred that the amount of diuretic employed be from about 3.0% to about 9.0% by weight. Although various mixtures of the aforementioned non-volatile polyethylene glycols may be employed, it is preferred to use a mixture of non-volatile polyethylene glycols having an average molecular weight of about 400. Such a mixture is usually referred to as polyethylene glycol 400. A preferred embodiment of the present invention comprises a clear solution of from 3.0% to 9.0% by weight of 5-acetylimino-4-methyl-$\Delta^2$-1,3,4-thiadiazoline-2-sulfonamide dissolved in a mixture of polyethylene glycols having an average molecular weight of about 400.

Surprising indeed was the discovery that the diuretic 5 - acylimino - 4 - substituted - $\Delta^2$ - 1,3,4 - thiadiazoline-2-sulfonamides are from 2 to 3 times more soluble in the polyethylene glycols of the present invention than the corresponding 5-acylimino-1,3,4-thiazole-2-sulfonamides. This surprising property of the 5-acylimino-4-substituted - $\Delta^2$ - 1,3,4 - thiadiazoline - 2 - sulfonamides makes possible the facile preparation of the parenteral compositions of the present invention.

In addition to the diuretic 5-acylimino-4-substituted-$\Delta^2$-1,3,4-thiadiazoline-2-sulfonamides, the parenteral solutions of the present invention may also contain various preservatives which may be used to prevent bacterial and fungal contamination. The preservatives which may be used for such purpose are, for example, benzyl alcohol, myristyl-gamma-picolinium chloride, phenyl mercuric nitrate, benzalkonium chloride, phenyl-ethyl alcohol, p-chlorophenyl - $\alpha$ - glycerol ether, methyl and propyl parabens, and thimerosal. The solutions may also contain other polyethylene glycol soluble drugs such as the tetracycline antibiotics and the anti-inflammatory steroid hormones.

The following examples are provided for illustrative purposes and may include particular features of the invention. However, the examples should not be construed as limiting the invention, many variations of which are possible without departing from the spirit or scope thereof.

EXAMPLE 1

In 100 ml. of polyethylene glycol 400 was dissolved 2.6 g. of 5-acetylimino-4-methyl-$\Delta^2$-1,3,4-thiadiazoline-2-sulfonamide. In 100 ml. of distilled water was dissolved 2.6 g. of the sodium salt of 5-acetylimino-4-methyl-$\Delta^2$-1,3,4-thiadiazoline-2-sulfonamide. Aliquot portions of each solution were taken, placed in vials, and transferred to an autoclave. The samples were autoclaved at 15 p.s.i. for 30 minutes and 1.5 hours. After each lapse of time, a sample was removed and assayed. The assay results are set forth in Table I below:

Table I
DIURETIC ASSAY AFTER AUTOCLAVING

| Solution Composition | Solution potency, mg./ml. | | |
|---|---|---|---|
| | Theoretical | After 30 minutes | After 1.5 hours |
| 2.6 g. diuretic in 100 ml. PEG–400 | 26.0 | 25.9 | 25.4 |
| 2.6 g. diuretic sodium salt in 100 ml. water | 26.0 | 23.7 | 17.4 |

PEG–400=polyethylene glycol 400.

It is clearly apparent from the above data that the 5 - acylimino - 4 - substituted - $\Delta^2$ - 1,3,4 - thiadiazoline-2-sulfonamides are unusually stable in the parenteral vehicles of the present invention. It was further found that the novel compositions of the present invention could be autoclaved at 15 p.s.i. for up to 4 hours with very little decomposition of the diuretic compounds contained therein.

EXAMPLE 2

To determine the solubility of 5-acetylimino-4-methyl-$\Delta^2$-1,3,4-thiadiazoline-2-sulfonamide in polyethylene glycol 400, this compound in powder form was added to this solvent slowly, with constant stirring, until a white precipitate was noticeably visible to the naked eye. The suspension was then filtered and the filtrate was assayed chemically and found to contain 8.9% by weight of 5-acetylimino - 4 - methyl - $\Delta^2$ - 1,3,4 - thiadiazoline - 2-sulfonamide.

To determine the solubility of 5-acetylamino-1,3,4-thiazole-2-sulfonamide in polyethylene glycol 400, this compound in powder form was added to this solvent slowly, with constant stirring, until a white precipitate was noticeably visible to the naked eye. The suspension was then filtered and the filtrate was assayed chemically and found to contain 3.4% by weight of 5-acetylamino-1,3,4-thiazole-2-sulfonamide.

It is clearly apparent from this data that the 5-acetylimino - 4 - methyl - $\Delta^2$ - 1,3,4 - thiadiazoline - 2 - sulfonamide is at least 2½ times more soluble in polyethylene glycol 400 than the corresponding 5-acetylamino-1,3,4-thiazole-2-sulfonamide.

What is claimed is:

1. A pharmaceutical product adapted for parenteral use comprising a clear solution of from 3.0% to 9.0% by weight of a 5-acylimino-4-substituted-$\Delta^2$-1,3,4-thiadiazoline-2-sulfonamide selected from the group consisting of 5-formylimino-4-methyl-$\Delta^2$-1,3,4-thiadiazoline-2-sulfonamide,
5-acetylimino-4-methyl-$\Delta^2$-1,3,4-thiadiazoline-2-sulfonamide,
5-acetylimino-4-ethyl-$\Delta^2$-1,3,4-thiadiazoline-2-sulfonamide,
5-acetylimino-4-butyl-$\Delta^2$-1,3,4-thiadiazoline-2-sulfonamide,
5-acetylimino-4-benzyl-$\Delta^2$-1,3,4-thiadiazoline-2-sulfonamide,
5-acetylimino-4-p-nitrobenzyl-$\Delta^2$-1,3,4-thiadiazoline-2-sulfonamide,
5-propionylimino-4-methyl-$\Delta^2$-1,3,4-thiadiazoline-2-sulfonamide,
5-propionylimino-4-ethyl-$\Delta^2$-1,3,4-thiadiazoline-2-sulfonamide,
5-propionylimino-4-butyl-$\Delta^2$-1,3,4-thiadiazoline-2-sulfonamide,
5-butyrylimino-4-methyl-$\Delta^2$-1,3,4-thiadiazoline-2-sulfonamide and
5-butyrylimino-4-benzyl-$\Delta^2$-1,3,4-thiadiazoline-2-sulfonamide, dissolved in a mixture of polyethylene glycols having an average molecular weight of about 400.

2. A pharmaceutical product adapted for parenteral use comprising a clear solution of from 3.0% to 9.0% by weight of 5-acetylimino-4-methyl-$\Delta^2$-1,3,4-thiadiazoline-2-sulfonamide dissolved in a mixture of polyethylene glycols having an average molecular weight of about 400.

References Cited in the file of this patent

UNITED STATES PATENTS 2,783,241   Young et al. _____ Feb. 26, 1957

FOREIGN PATENTS 784,659   Great Britain _____ Oct. 16, 1957

OTHER REFERENCES

Carbowax, Polyethylene Glycols for Pharmaceuticals and Cosmetics, 40 page brochure of Union Carbide Chem. Co., pp. 24–25 relied upon (rec'd in POSL June 24, 1960).